United States Patent [19]

Minc

[11] Patent Number: 5,546,393
[45] Date of Patent: Aug. 13, 1996

[54] ASYNCHRONOUS TRANSFER MODE DATA CELL ROUTING DEVICE FOR A REVERSE OMEGA NETWORK

[75] Inventor: Charles Minc, Paris, France

[73] Assignee: M E T, Massy, France

[21] Appl. No.: 491,075

[22] Filed: Jun. 19, 1995

[30] Foreign Application Priority Data

Jun. 20, 1994 [FR] France .................... 94 07526

[51] Int. Cl.[6] .................................................. H04L 12/56
[52] U.S. Cl. ........................................ 370/60.1; 370/94.1
[58] Field of Search ................................ 370/60, 60.1, 61, 370/68.1, 80, 91, 92, 94.1, 95.1, 99, 110.1, 111

[56] References Cited

U.S. PATENT DOCUMENTS

| | | | |
|---|---|---|---|
| 4,365,292 | 12/1982 | Barnes et al. | 364/200 |
| 5,287,346 | 2/1994 | Bianchini et al. | 370/60 |
| 5,287,491 | 2/1994 | Hsu | 395/575 |
| 5,299,317 | 3/1994 | Chen et al. | 395/325 |
| 5,440,549 | 8/1995 | Min et al. | 370/60 |

FOREIGN PATENT DOCUMENTS

| | | |
|---|---|---|
| 0549122 | 6/1993 | European Pat. Off. . |
| 2678794 | 1/1993 | France . |

Primary Examiner—Douglas W. Olms
Assistant Examiner—Matthew C. Phillips
Attorney, Agent, or Firm—Larson and Taylor

[57] ABSTRACT

A routing bits generator is associated with one or more reverse Omega networks with L stages and $2^N$ inputs. $2^N$ state bits, indicating whether the cells to be routed are free or occupied, are loaded in parallel into a state register, then shifted in series in this register. The state bits delivered successively by the serial output of the state register, filtered if $L<N$, serve to increment a first counter or decrement a second counter depending on the values of the state bits, and to select one or the other of the two counters at the input of a multiplexer. L addressing registers, receiving in serial shift mode the L address bits provided by the multiplexer, are cascaded in such a way that after $2^N$ serial shift cycles, their contents can be transferred in parallel to means inserting the address bits at the head of the cells.

4 Claims, 9 Drawing Sheets

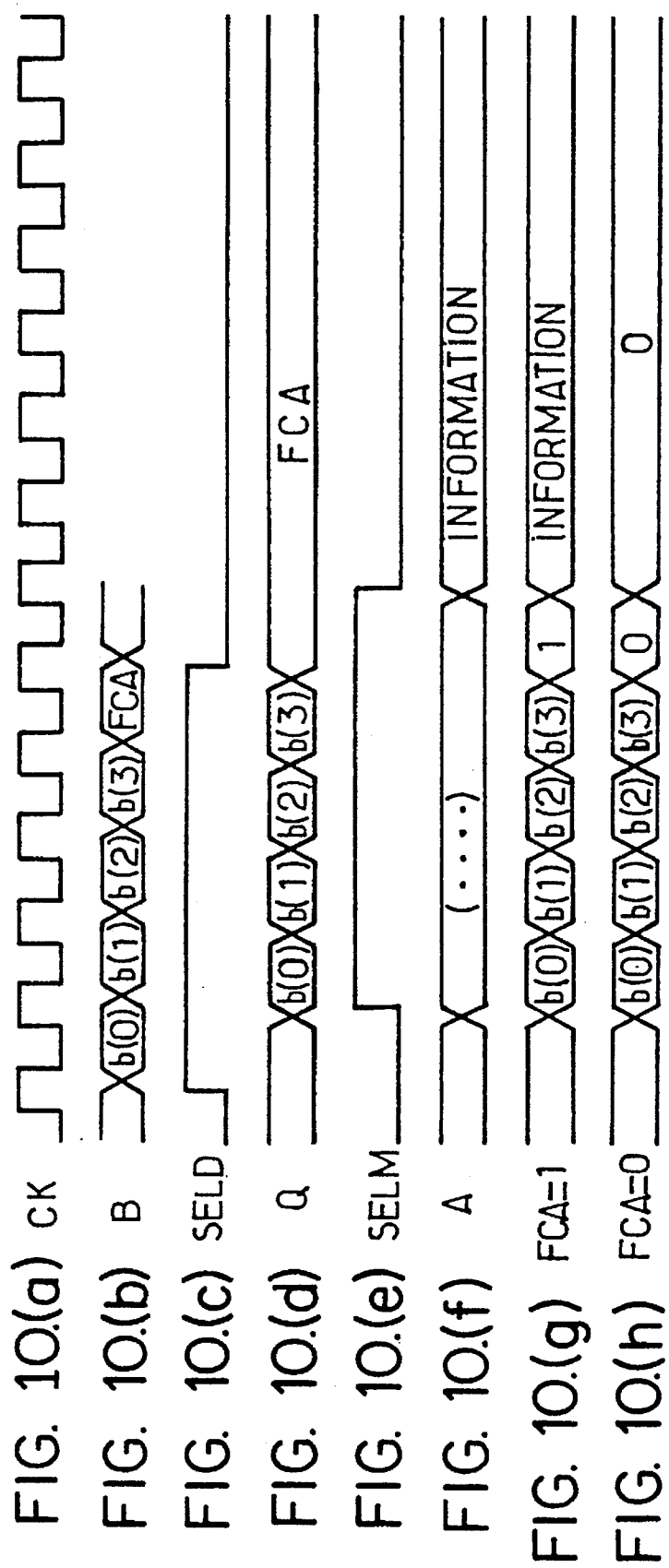

ASYNCHRONOUS TRANSFER MODE DATA CELL ROUTING DEVICE FOR A REVERSE OMEGA NETWORK

BACKGROUND OF THE INVENTION

The present invention relates to the field of communications in asynchronous transfer mode (ATM). It relates more particularly to the use of reverse Omega networks in ATM type binary data packet (or cell) switches. ATM techniques are envisaged for broadband integrated services networks, the data borne by the cells possibly representing audio or video data, computer data or the like.

"Information bits of the cells" is understood herein to mean both the bits representing the user information and those representing the network information (headers of the ATM cells).

A reverse Omega network with $2^N$ inputs and L stages ($L \leq N$) consists of a matrix of $2^{N-1}$ rows and L columns of binary switching elements, with two inputs and two outputs, interconnected according to the following law (assuming the inputs and outputs of each column to be numbered from i=0 to $i=2^N-1$ from the bottom to the top of the column):

- the $2^N$ inputs of column 0 constitute the $2^N$ ordered inputs of the network;
- output i of column j−1 is connected to the input Rrot(i) of column j, for $0 \leq i \leq 2^N-1$ and $1 \leq j \leq L-1$;
- output i of column L−1 constitutes the output Rrot(i) of the network, for $0 \leq i \leq 2^N-1$;
- i lying between 0 and 2N−1 is represented by N bits with base 2, and the notation Rrot(i) used above denotes the number lying between 0 and 2N−1 whose binary representation corresponds to the N bits representing i, subjected to a circular permutation of one position to the right. For example with N=5 and i=25=$[11001]_2$, we have Rrot(i)=$[11100]2_2$=28. Each stage of the reverse Omega network consists of a column of $2^{N-1}$ binary switching elements and of the interconnection pattern situated downstream towards the next column.

The binary switching element 15 is for example in accordance with the diagram of FIG. 1. The lower input IN0 and upper input IN1 are each connected to an input of two respective AND gates 16,17 and 18,19. An OR gate 20 has two inputs connected respectively to the outputs of the AND gates 16 and 18 and an output constituting the lower output SS0 of the element 15. An OR gate 21 has two inputs connected respectively to the outputs of the AND gates 17 and 19, and an output constituting the upper output SS1 of the element 15. The element 15 furthermore includes a D flip-flop 22 clocked by a signal Hg, whose D input is connected to the upper input IN1 of the element 15. The second inputs of the AND gates 16 and 19 are each connected to the Q output of the flip-flop 22, and the second inputs of the AND gates 17 and 18 are each connected to the inverted output $\overline{Q}$ of the flip-flop 22.

By way of example, FIG. 2 shows a switching fabric consisting of a reverse Omega network 24 with 32 inputs and 5 stages (N=L=5) composed of binary switching elements 15 of the type illustrated in FIG. 1. FIG. 3 shows a switching fabric comprising a reverse Omega network 25 with 32 inputs and 4 stages (N=5,L=4) supplemented with a concentration stage 26. FIG. 4 shows a switching fabric comprising a reverse Omega network 28 with 32 inputs and 2 stages (N=5,L=2) supplemented with three successive concentration stages 29, 30 and 31. In the fabrics of FIGS. 3 and 4, where there are N−L successive concentration stages each having a concentration ratio of 2/1 (so that the overall fabric has $2^N$ inputs and $2^L$ outputs), the k-th concentration stage is composed of $2^{N-k}$ OR gates 33 arranged columnwise. Each OR gate 33 has two inputs connected respectively to two consecutive outputs of the preceding stage (concentration stage or last stage of the reverse Omega network). In other words, the output i of the k-th concentration stage ($1 \leq k \leq N-L$ and $0 \leq i \leq 2^{N-k}-1$) is provided by an OR gate 33 whose two inputs are connected to the outputs $2i$ and $2i+1$ of the preceding stage.

Each data cell arriving at an input of a fabric of the type illustrated in FIG. 2, 3 or 4 includes a header of L bits at least, the (j+1)-th bit b(j) of the header ($0 \leq j \leq L-1$) being intended to control the switching in the binary switching elements of column j of the reverse Omega network, by routing the cell to the upper output SS1 when b(j)=1 and to the lower output SS0 when b(j)=0. This switching is achieved by sending to the elements 15 of column j a clocking signal Hg adjusted so as to allow storage of the bit b(j) in the flip-flop 22 over the duration of transit of a cell. A priori, a conflict may therefore occur in a binary switching element 15 if two cells arrive simultaneously on its two inputs IN0 and IN1 with identical routing bits b(j).

It is desirable to generate the routing bits b(j) for the various cells in such a way as to avoid such conflicts arising.

The reverse Omega networks have the property of being self-routing. In the case of FIG. 2, where N=L, this means that the routing bits b(N−1) . . . , b(1),b(0) included within the header of each cell and considered in the inverse order of the columns are the binary representation of the output address, that is to say of the number of that output of the reverse Omega network to which the cell will be routed. This self-routing property is generalizable to the case where L<N and where the L stages of the reverse Omega network are followed by N−L concentration stages such as represented in FIGS. 3 and 4 : the L routing bits b(L-1), . . . ,b(0) are then likewise the binary representation of the output address, that is to say of the number of that output of the overall fabric to which the cell will be routed.

A routing algorithm which eliminates conflicts in a switching fabric such as represented in FIG. 2, 3 or 4 has been set out in the document FR-A-2 678 794. In the brief discussion of the routing algorithm which follows and throughout the specification, the terms "free" or "empty" cells and "occupied" cells are used. These terms are interchangeable with other similar terms of art such as "idle" (for "free" or "empty") and "active" or "busy" (for "occupied"). The terms "unmarked" ("free") and "marked" ("occupied") are also used below. This algorithm consists in allocating to the free or empty cells an output address resulting from the decrementation of a first counting variable with the arrival of each free cell, and in allocating to the occupied cells an output address resulting from the incrementation of a second counting variable with the arrival of each occupied cell. This ensures a routing of the free cells in the descending circular direction of the outputs, and a routing of the occupied cells in the rising circular direction of the outputs, without any risk of conflict in the reverse Omega network. When L<N it is possible that more than $2^L$ cells may arrive simultaneously at the input, something which does not provoke any conflict in the L stages of the reverse Omega network but may provoke collisions in the OR gates of the concentration stages. To avoid such collisions, the algorithm provides for the setting to zero of any cells in excess of $2^L$. Such a setting to zero causes the loss of the cell, but the probability of such a loss is in general fairly low, as in the concentrators of knockout switches (see "The Knockout switch a simple, modular architecture for high-performance packet switching", Y. S. Yeh et al., IEEE Journal on Selected Areas in Communications, Vol. SAC-5, No. 8, October 1987, pages 1274–1283).

At each cell time, the above algorithm involves the calculation of $2^N$ addresses of L bits and their insertion at the head of the $2^N$ cells, free or occupied, which are to be addressed simultaneously to the $2^N$ inputs of the switching fabric. Software implementation would require sequential calculations and insertions which would introduce significant cell transmission delays. The same difficulty is encountered in the case of hardware implementation.

An object of the invention is to associate a switching fabric comprising a reverse Omega network with a routing bits generator which avoids conflicts between cells without excessively delaying their transmission.

SUMMARY OF THE INVENTION

The invention thus proposes an asynchronous transfer mode data cell routing device comprising at least one reverse Omega network with L stages and $2^N$ inputs receiving synchronized cells, L and N being two integers such that $L \leq N$, and a routing bits generator comprising:

- a state register of $2^N$ bits, having a serial shift mode and a parallel transfer mode in which it receives $2^N$ state bits each indicating whether the cell destined for one of the $2^N$ inputs of the network is free or occupied;
- a first counter on L bits, incremented by one unit when a state bit obtained from the serial output of the state register in serial shift mode indicates an occupied cell;
- a second counter on L bits, decremented by one unit when the state bit obtained from the serial output of the state register in serial shift mode indicates a free cell;
- addressing registers of $2^N$ bits each, having a serial shift mode and a parallel transfer mode, cascaded so that the (i+1)-th addressing register receives the contents of the i-th addressing register in parallel transfer mode for $1 \leq i < L$; and
- a multiplexer having L output bits addressed respectively to the serial inputs of the L addressing registers, a first L-bit input connected to the output of the first counter on L bits and selected when the state bit obtained from the serial output of the state register in serial shift mode indicates an occupied cell, and a second L-bit input connected to the output of the second counter on L bits and selected when the state bit obtained from the serial output of the state register in serial shift mode indicates a free cell, the routing device further comprising routing bits insertion means successively receiving L sets of $2^N$ address bits from the L-th addressing register in parallel transfer mode, in order to insert at the head of each cell addressed to an input of the network routing bits comprising L address bits received in succession from one of the locations of the L-th addressing register in parallel transfer mode.

The routing device operates as follows. For each group of $2^N$ cells to be presented to the inputs of the reverse Omega network, the state register receives firstly in parallel the $2^N$ corresponding state bits. Next, the state and addressing registers are placed in serial shift mode in order to perform $2^N$ shift operations during which the addresses of $2^N$ cells are successively calculated by one or the other of the two counters and loaded bit by bit into the L addressing registers. Once the $2^N$ addresses have thus been loaded, they are transferred in parallel and inserted as header of the corresponding cells. In all, therefore, this procedure requires only of the order of $1+2^{N+L}$ clock cycles of the routing bits generator. The generator moreover guarantees the absence of conflict in the reverse Omega network.

When L<N, the L stages of the reverse Omega network are most often followed by N–L successive concentration stages arranged as described previously with reference to FIGS. 3 and 4. There is then provided advantageously, between the serial output and input of the state register, a feedback line including filtering means for transmitting to the serial input of the state register the state bit provided by the serial output of the state register in serial shift mode as long as the number of state bits indicating occupied cells which have been thus transmitted since the reception in parallel of a set of $2^N$ state bits by the state register does not exceed $2^L$ and for transmitting to the serial input of the state register a state bit value representative of a free cell when said number of state bits has exceeded $2^L$. The state register is cascaded with the L addressing registers in such a way that the first addressing register receives the contents of the state register in parallel transfer mode. The routing bits insertion means thus receive from the L-th addressing register, after the L sets of $2^N$ address bits, the $2^N$ state bits filtered by the filtering means. The insertion means are arranged so that they set to zero the information bits of any cell for which the filtered state bit indicates a free cell. This prevents collisions in the concentration stages, since the occupied cells in excess of $2^L$ as well as all the free cells are then set to zero.

When L=N, the feedback line can connect the serial output of the state register directly to its serial input, since overflow of capacity cannot arise in the reverse Omega network.

Another property of the routing device according to the invention is that it ensures traffic equalization at the output. In other words, whatever the distribution of the occupied cells in the $2^N$ input lines, the occupied cells are statistically distributed uniformly over the $2^L$ outputs of the switching fabric ($L \leq N$).

The device according to the invention can moreover be operated as a $2^N$ by 1 multiplexer. In this case, the routing bits insertion means are arranged in order to insert, at the head of each cell and after the L address bits, the filtered (L<N) or unfiltered (L=N) state bit corresponding to this cell, and each of the $2^L$ outputs of the overall switching fabric is connected to an output queue into which the writing of the data of a cell is performed only if the state bit inserted at the head of this cell indicates an occupied cell. Multiplexing is achieved by reading out the $2^L$ queues cyclically to the output of the device. In the case where L<N, such a $2^N$ by 1 multiplexer is operationally similar to a multiplexer of a knockout type switch. However, as compared with the knockout system, the proposed multiplexer has the advantage of requiring many fewer logic components.

BRIEF DESCRIPTION OF THE DRAWINGS

FIG. 10 shows timing diagrams explaining the insertion of the routing bits at the head of the cells.

DESCRIPTION OF PREFERRED EMBODIMENTS

Figure 5:
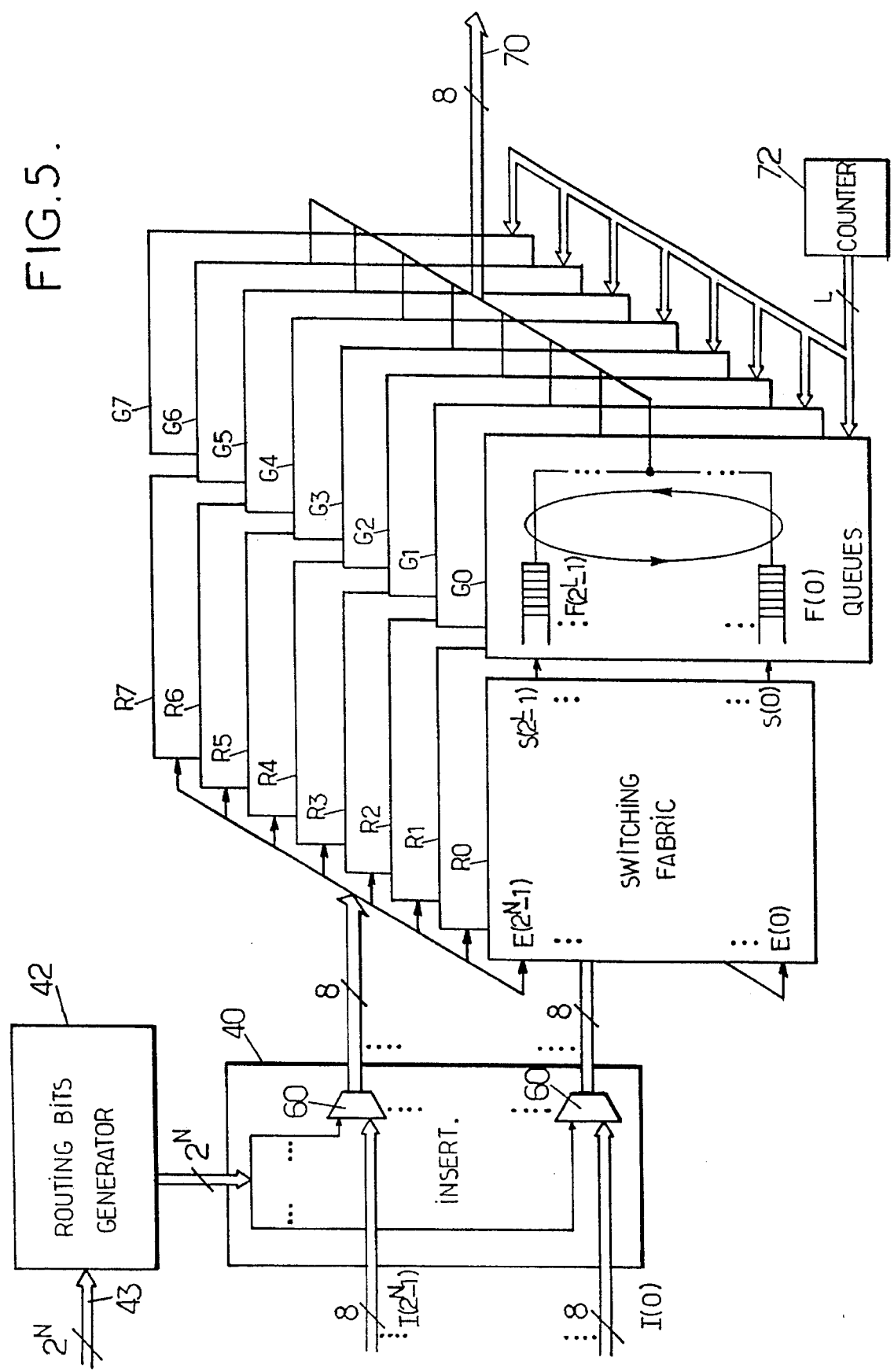
FIG. 5 is an overall schematic diagram of a routing device according to the invention operating as a $2^N$ by 1 multiplexer.

The device represented in FIG. 5 processes sets of $2^N$ ATM cells which arrive thereat in a synchronized manner on $2^N$ inputs $I(0), \ldots, I(2^N-1)$. In accordance with the recommendations of the CCITT, each cell consists for example of 53 bytes of 8 bits. As FIG. 5 illustrates, eight identical switching fabrics R0 to R7 with $2^N$ inputs $E(0), \ldots, E(2^N-1)$ and $2^L$ outputs $S(0), \ldots, S(2^L-1)$ may be provided for routing in parallel the eight bits of each byte, the eight bits of one and the same byte being addressed to inputs of like rank of the fabrics R0 to R7 and being routed to the outputs of like rank of these fabrics. Such parallelism, making it possible to reduce the processing speeds for a given information bit rate, is optional and may moreover be implemented in a different manner.

Figure 2:
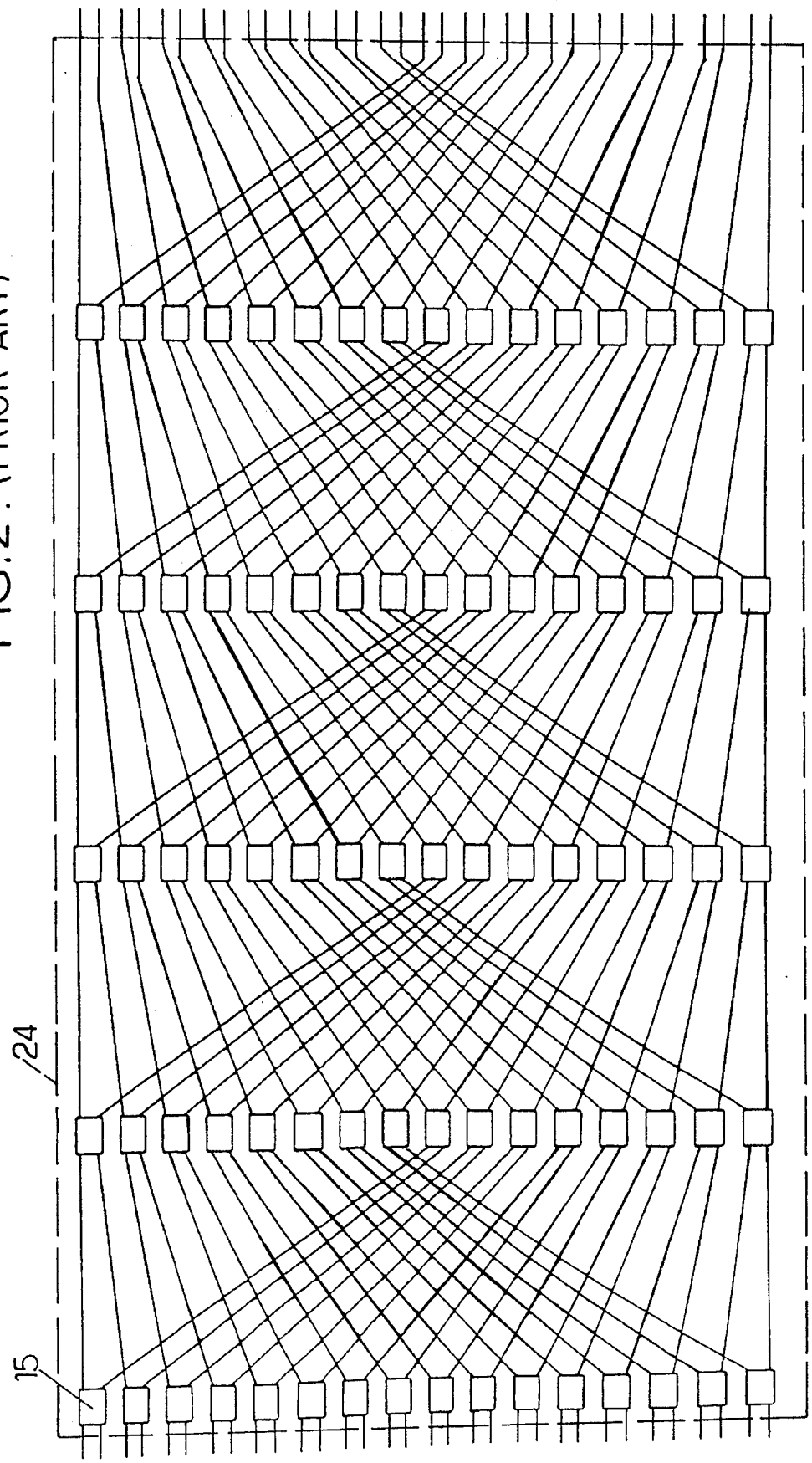
FIGS. 2 to 4, discussed previously, are diagrams of three switching fabrics each including an reverse Omega network.
Figure 3:
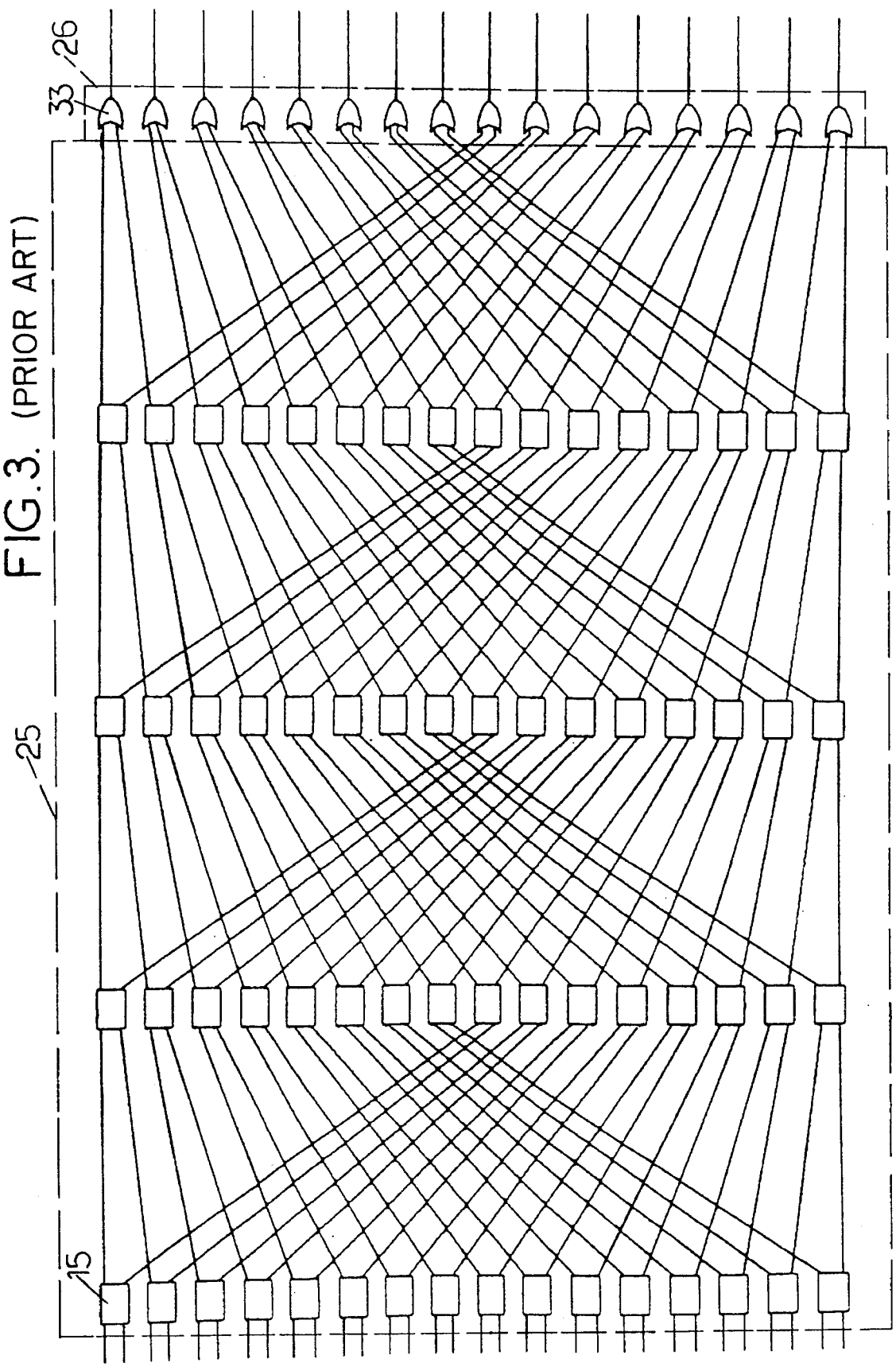
Figure 4:
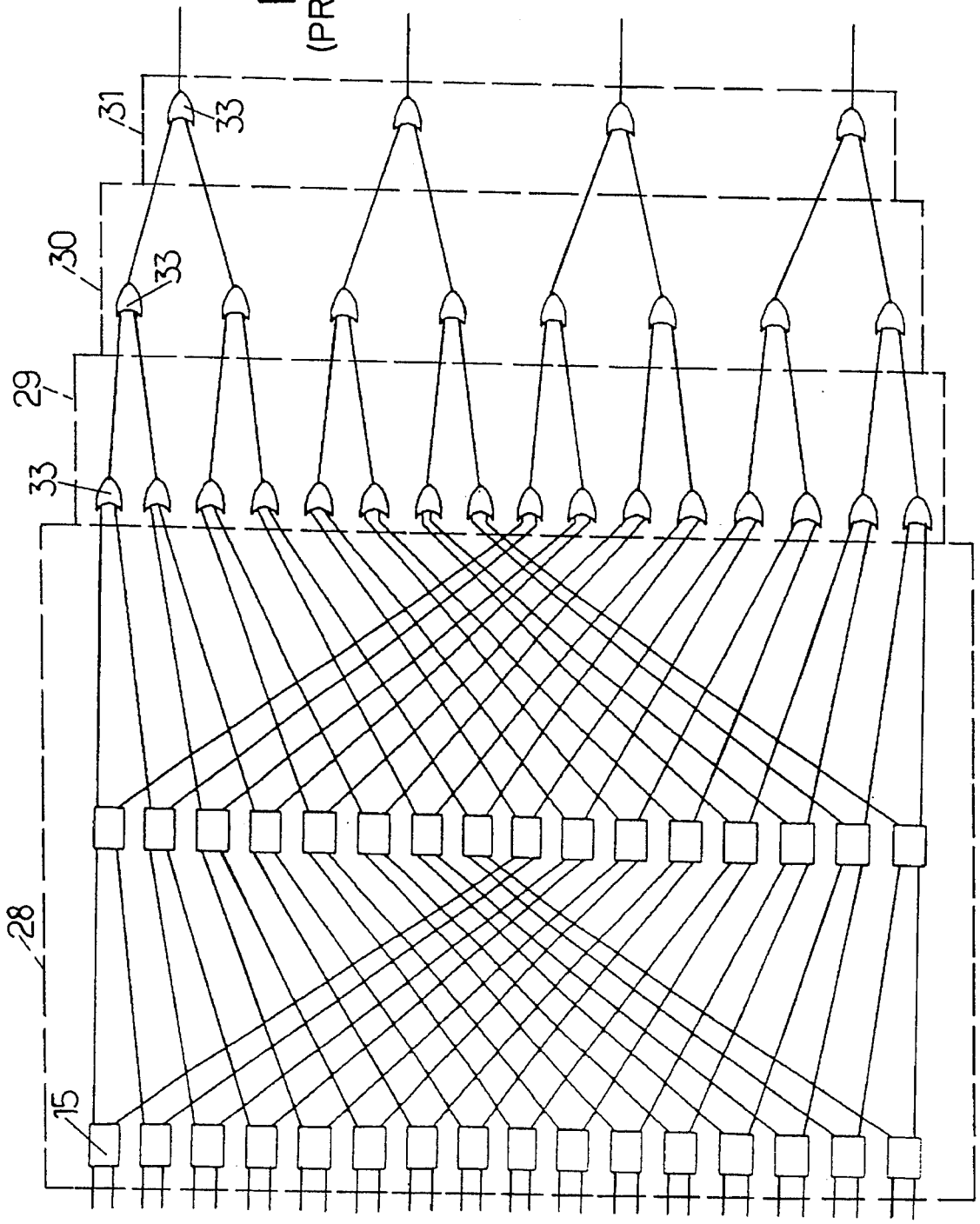

The switching fabrics R0 to R7 are for example in accordance with one of FIGS. 2 to 4, with a reverse Omega network with $2^N$ inputs and L stages which is followed, if L<N, by N−L concentration stages. A set 40 of $2^N$ multiplexers 60 is provided in order to insert at the head of each cell L+1 routing bits among which the first L bits $b(0), \ldots, b(L-1)$ are used to control the switching in the columns $0, \ldots, L-1$ of the reverse Omega network. The L+1 routing bits are the same for each of the eight parallel processing channels relating to one and the same input $I(0), \ldots, I(2^N-1)$ of the device. The routing bits are received from the generator 42 in the form of L+1 successive sets of $2^N$ bits each relating to one of the inputs of the device.

The equipment situated upstream delivers, apart from the information bits of the $2^N$ incoming cells, $2^N$ state bits $CA(0), \ldots, CA(2^N-1)$ each indicating whether one of the cells presented to an input $I(i)$ ($0 \leq i \leq 2^N-1$) is free ($CA(i)=0$) or occupied ($CA(i)=1$). These state bits are provided to the routing bits generator 42 on a parallel input 43 with $2^N$ binary lines.

Figure 6:
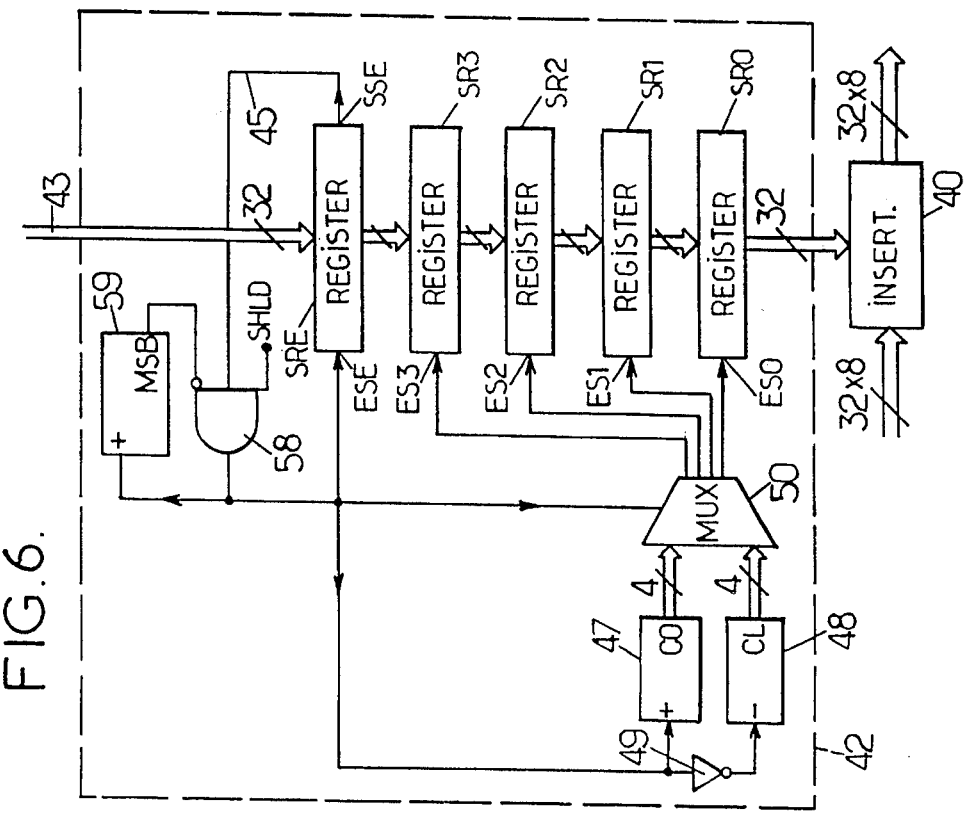
FIG. 6 is a diagram of a routing bits generator usable in the device of FIG. 5 when N=5 and L=4.

A routing bits generator 42 usable when N=5 and L=4 is represented in FIG. 6, the fabrics R0 to R7 then being in accordance with FIG. 3. The generator 42 includes L+1=5 registers SRE, SR0 to SR3 of $2^N$=32 bits each. Each of these registers has a parallel transfer mode and a serial shift mode. The registers SRE, SR3, SR2, SR1 and SR0 are cascaded in such a way that, in parallel transfer mode, the (i+1)th addressing register SR(L−1−i) ($1 \leq i3$) is loaded with the contents of the i-th addressing register SR(L−i) and that the register SR3 is loaded with the contents of the register SRE. In parallel transfer mode, the register SRE is loaded with the $2^N$ state bits $CA(0), \ldots, CA(2^N-1)$ received on the parallel input 43, and the contents of the register SR0 are transmitted to the insertion means 40. In serial shift mode, each register receives a bit on its serial input ESE, ES3, ES2, ES1, ES0 (on the left in FIG. 6) and shifts its contents by one position to the right. A feedback line 45 connects the serial output SSE of the state register SRE to its serial input ESE.

Figure 1:
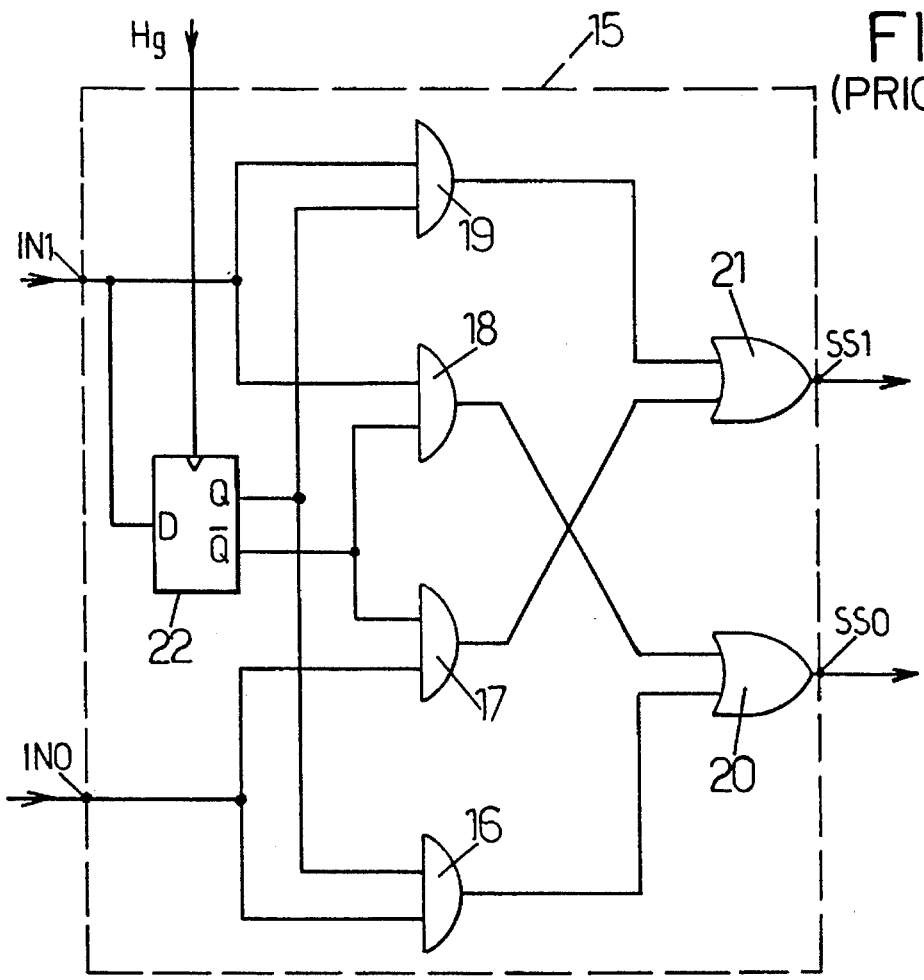
FIG. 1, discussed previously, is a diagram of a binary switching element usable in an reverse Omega network.
Figure 8:
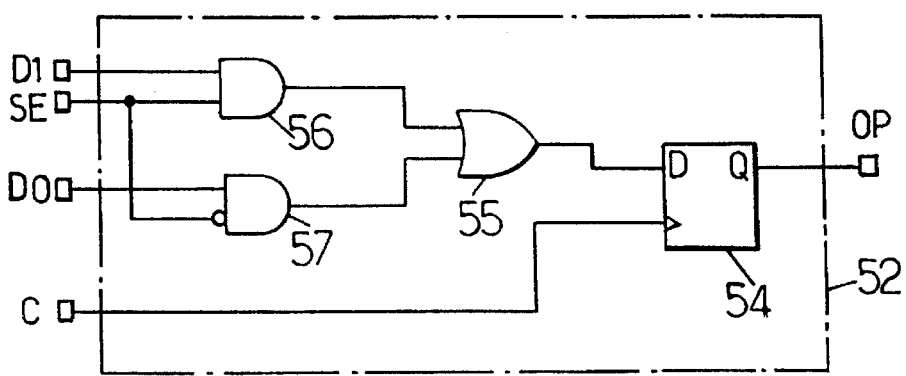
FIG. 8 is a diagram of an element for storing a bit in a register according to FIG. 7.
Figure 7:
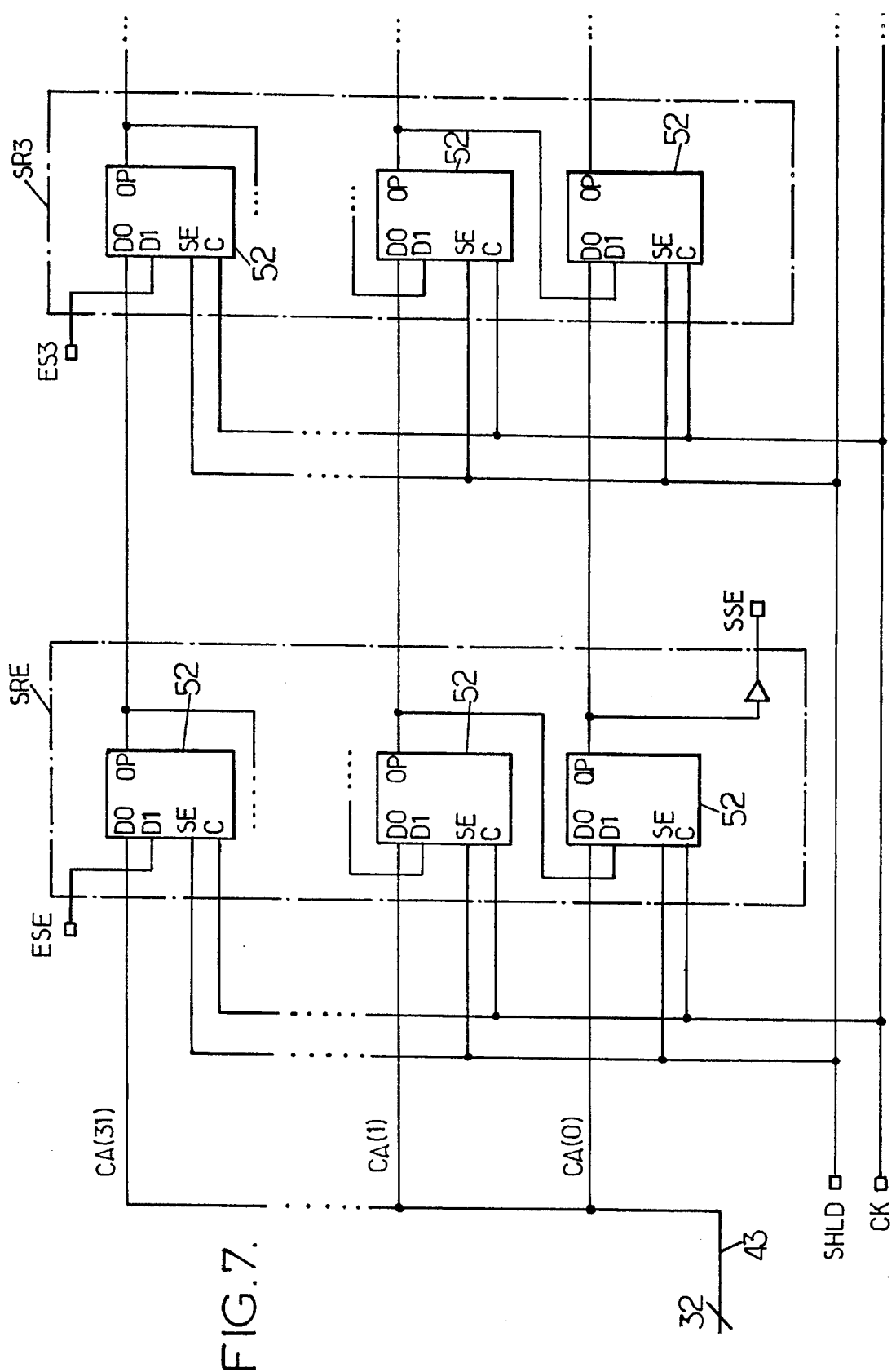
FIG. 7 is a more detailed diagram of registers forming part of the generator of FIG. 6.

The structure of the shift registers is detailed in FIGS. 7 and 8. Each register is composed of $2^N$=32 selection and storage elements 52 each having a parallel input D0, a serial input D1, a mode selection input SE, a clock input C and an output OP. All the inputs SE receive a mode selection signal SHLD, the serial shift mode corresponding to SHLD=1 and the parallel transfer mode to SHLD=0. The clock inputs C all receive a signal CK for clocking transfers (bit clock). The signals SHLD and CK are provided by a time base, not represented, of the device. The element 52 (FIG. 8) includes a D flip-flop 54, clocked by the signal received on the clock input C, whose Q output constitutes the output OP of the element 52. The D input of the flip-flop 54 is connected to the output of an OR gate 55 whose two inputs are connected respectively to the outputs of two AND gates 56,57. The AND gate 56 has two inputs connected to the inputs D1 and SE of the element 52. The AND gate 57 has an input connected to the input D0 of the element 52 and an inverted input connected to the input SE. Thus, when SHLD=1, the serial input D1 is selected in order to store a bit in the flip-flop 54, whereas the parallel input D0 is selected when SHLD=0.

The parallel inputs D0 of the state register SRE are connected to the 32 lines of the input 43 in order to receive the state bits CA(i) in parallel transfer mode (SHLD=0). In order to cascade two successive registers, the outputs OP of the elements 52 of the first register are connected to the parallel inputs D0 of the corresponding elements 52 of the second register. The serial input ESE, ES3 of a register consists of the serial input D1 of the first element 52 of this register (for example the one corresponding to the state bit CA(31) as shown in FIG. 7). Next, the i-th element 52 of the register ($2 \leq i \leq 32$) has its serial input D1 connected to the output OP of the (i−1)th element 52 of this same register. The serial output SSE of the state register SRE consists of the output OP of the last element 52 of this register.

The feedback line 45 includes filtering means consisting, in the example represented in FIG. 6, of an AND gate 58 and a counter 59 on L+1=5 bits. The output of the AND gate 58 is connected on the one hand to the serial input ESE of the state register SRE, and on the other hand to the incrementation input of the counter 59. An input of the AND gate 58 is connected to the serial output SSE of the 15 state register, and its other two inputs respectively receive the mode selection signal SHLD and the logical complement of the most significant bit MSB of the counter 59. Before the arrival of each set of 32 state bits CA(i), the counter 59 is initialized to zero.

Once the $2^N$=32 state bits $CA(0), \ldots, CA(31)$ have been loaded in parallel into the state register SRE (SHLD=0), the generator 42 executes 32 serial shift cycles (SHLD=1) in the course of which the addresses for routing the cells are calculated. The generator 42 comprises for this purpose two counters 47,48 on L=4 bits. The counter 47 has an incrementation input connected to the output of the AND gate 58, so that its counting value CO is incremented by one unit when the filtered state bit FCA(i) transmitted by the feedback line 45 in serial shift mode equals 1 (occupied cell). The counter 48 has a decrementation input connected to the output of the AND gate 58 via an inverter 49, so that its counting value CL is decremented by one unit when the filtered state bit FCA(i) transmitted by the feedback line 45 equals 0 (free cell). A multiplexer 50 has two inputs on L=4 bits receiving respectively the counting values CO and CL provided by the counters 47 and 48. The L=4 output bits of the multiplexer 50 are addressed respectively to the serial inputs ES0 to ES3 of the addressing registers SR0 to SR3.

The selection of the inputs of the multiplexer 50 is carried out on the basis of the filtered state bit FCA(i) transmitted by the feedback line in serial shift mode: the value CO is selected when FCA(i)=1 (occupied cell), and the value CL is selected when FCA(i)=0 (free cell). On start-up the counters 47 and 48 are initialized to values CO and CL such that CL=CO−1. This initialization condition precludes one and the same address being assigned both to a free cell and to an occupied cell in a set of $2^N=32$ cells to be routed simultaneously. For a given set of $2^N=32$ state bits, as long as the number of state bits CA(i) which equal 1 (occupied cell) does not exceed $2^L=16$, the most significant bit MSB of the counter 59 remains at 0 and the feedback line 45 simply transmits the state bit: FCA(i)=CA(i). As soon as there are more than 16 occupied cells, the MSB bit takes the value 1 and disables the AND gate 58. The feedback line 45 then transmits the value FCA(i)=0, thus limiting to $2^L=16$ the number of occupied cells simultaneously routed.

The address bits $b_i(0), \ldots, b_i(3)$ relating to cell i addressed to the input I(i) of the fabric ($0 \leq i \leq 31$) are introduced respectively into the addressing registers SR0 to SR3, the bit $b_i(j)$ ($0 \leq j \leq 3$) being intended to control the routing of cell i in column j of the reverse Omega network. Considered in inverse order $b_i(3), \ldots, b_i(0)$, these bits constitute the binary representation of the output address of cell i. The mode of counting by the counters 47, 48 and of selection by the multiplexer 50 ensures the absence of conflict in the reverse Omega network.

After the 32 serial shift cycles, the 32 addresses are present in the registers SR0 to SR3, and the filtered state bits FCA(i) are present at the corresponding locations in the register SRE. The generator 42 then executes L+1=5 transfer cycles in parallel (SHLD=0) so as to send in succession to the insertion means 40 the L=4 sets of $2^N=32$ address bits and then the set of $2^N=32$ filtered state bits. The generator 42 is then ready to receive and process the state bits relating to the next set of incoming cells.

Figure 9:
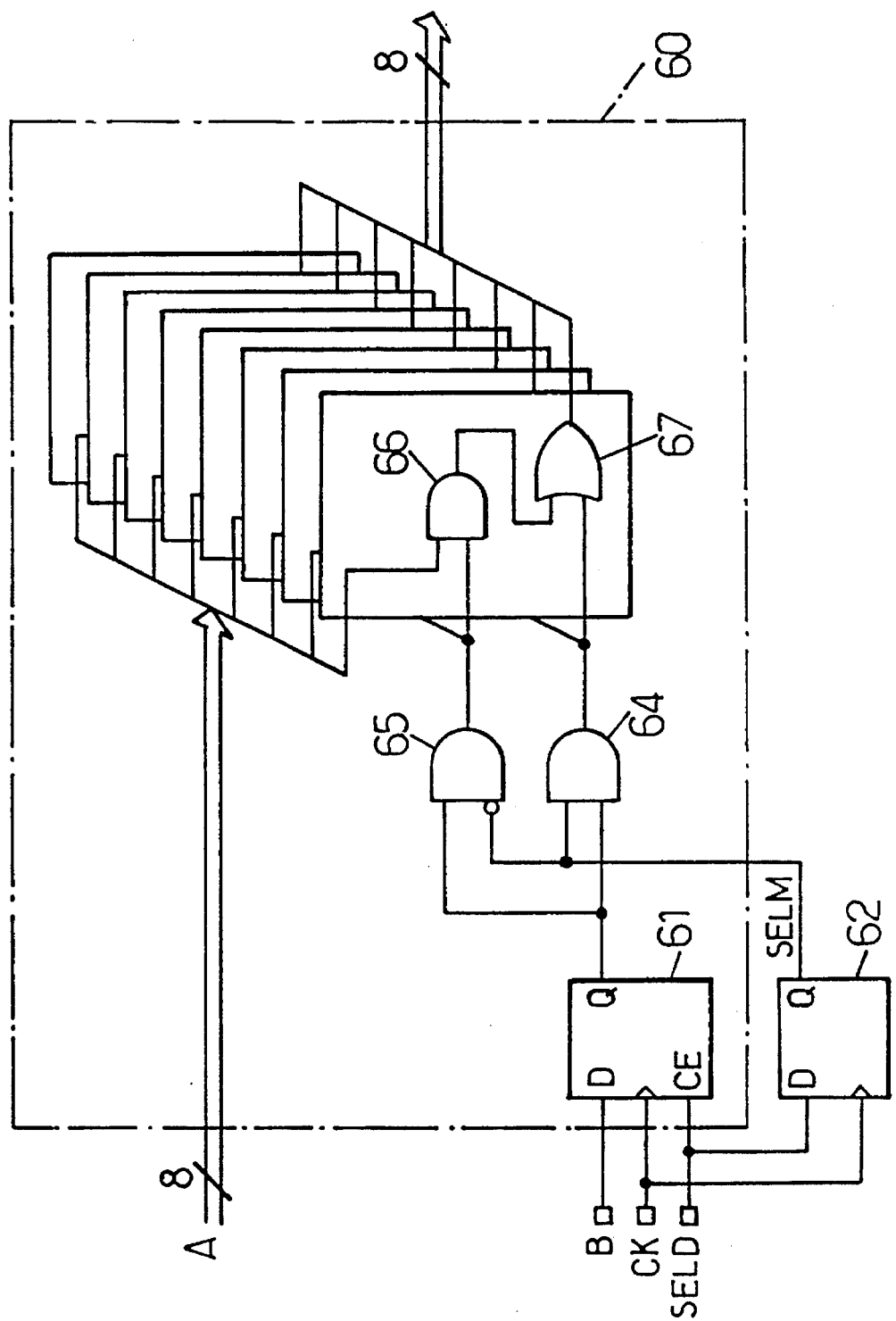
FIG. 9 is a diagram of a multiplexer of the routing bits insertion means in the device of FIG. 5.

FIG. 9 shows a multiplexer 60 of the insertion means 40 serving to insert the address and state bits at the head of a cell. An input B is connected to the output of the location relating to this cell in the last addressing register SR0 of the generator 42. The address bits b(0) to b(3) and the filtered state bit FCA are received in succession on this input as illustrated in the second line of FIG. 10. The input B of the multiplexer is connected to the input D of a D flip-flop 61 clocked by the bit clock CK and activated by a signal SELD produced by the time base in such a way that SELD=1 (flip-flop activated) during the arrival of the bits b(0) to b(3) and FCA (third line of FIG. 10). The signal SELD next reverts to 0 so that the bit FCA remains stored in the flip-flop 61 (fourth line of FIG. 10). Insertion is controlled by a selection signal SELM corresponding for example to the signal SELD delayed by one clock cycle by a D flip-flop 62 (fifth line of FIG. 10) or produced in a similar manner by the time base. An input A on 8 bits of the multiplexer 60 receives the information bits originating from one of the inputs I(i) of the device. The useful information of a cell (53 bits per line) is formatted in such a way as to arrive between two pulses of the signal SELM, the information stream being interrupted when SELM=1 as shown by the sixth line of FIG. 10. The multiplexer 60 includes an AND gate 64 whose two inputs are connected respectively to the Q outputs of the flip-flops 61 and 62. Another AND gate 65 has an input connected to the Q output of the flip-flop 61 and an inverting input connected to the Q output of the flip-flop 62. For each binary line relating to the input A, the multiplexer 60 includes an AND gate 66 and an OR gate 67 having an input connected to the output of the said AND gate 66. The other input of the OR gate 67 is connected to the output of the AND gate 64. The inputs of the AND gate 66 are respectively connected to the output of the AND gate 65 and to the said binary line. The output on 8 bits of the multiplexer 60 consists of the eight outputs from the OR gates 67 which provide the binary streams addressed to inputs of like rank of the switching fabrics R0 to R7.

The signals transmitted to the inputs of like rank of the fabrics R0 to R7 are illustrated by the last two lines of FIG. 10. The routing bits are inserted at the head of the cell by way of the AND gate 64 and the OR gates 67 while SELM=1. If the filtered state bit FCA relating to the cell equals 1 (occupied cell), the information bits of the cell are next transmitted by way of the AND gate 65, of the AND gates 66 and of the OR gates 67 (penultimate line of FIG. 10). If the cell is free or to be freed (FCA=0), the AND gate 65 remains disabled for the duration of the information field, and the information bits are set to zero as indicated by the last line of FIG. 10. This setting to zero eliminates the risks of collision in the concentration stages of the fabrics.

In the embodiment illustrated in FIG. 5, the routing device according to the invention operates as a $2^N$ by 1 channel multiplexer. Each switching fabric R0, . . . ,R7 is associated with an array G0, . . . ,G7 of $2^L$ output queues F(0), . . . , F($2^L-1$). Each output S(0), . . . ,S($2^L-1$) of a fabric consisting of an output from the (N–L)-th concentration stage of this fabric, is connected to a queue F(0), . . . ,F($2^L-1$) consisting of a FIFO type memory. When the filtered state bit FCA relating to a cell routed towards eight outputs of like rank of the fabrics R0 to R7 equals 1, writing of the information bits which follow is operated in the eight corresponding queues. If FCA=0, no write is performed. Thus, writes to the queues are conditioned by signals (the filtered state bits) transmitted along the same path as the information bits, and automatically synchronized.

Reading out of the queues to the output 70 of the device is performed cyclically under the supervision of a counter 72 on L bits. The counter 72 is incremented by one unit with each cell resend time, and delivers a read address on L bits to the queue arrays G0 to G7. This address points at the queues in which the cell to be sent is to be read. The arrays G0 to G7 deliver eight bits which are grouped together to restore the bytes on the output 70. If no occupied cell remains waiting in the arrays G0 to G7, the counter 72 is not incremented and no read is performed. The mode of routing in the switching fabrics and this management of the queues preserve, on the output, the order of arrival of the occupied cells.

The device described above with L<N can operate otherwise than as a $2^N$ by 1 multiplexer. For example, if the output queues are dispensed with, the device constitutes a $2^N$ by $2^L$ concentrator providing an additional traffic equalization function on its $2^L$ outputs (an output on 8 bits is constructed by grouping together the outputs of like rank of the fabrics R0 to R7) by virtue of the routing mode defined by the generator 42.

Figure 11:
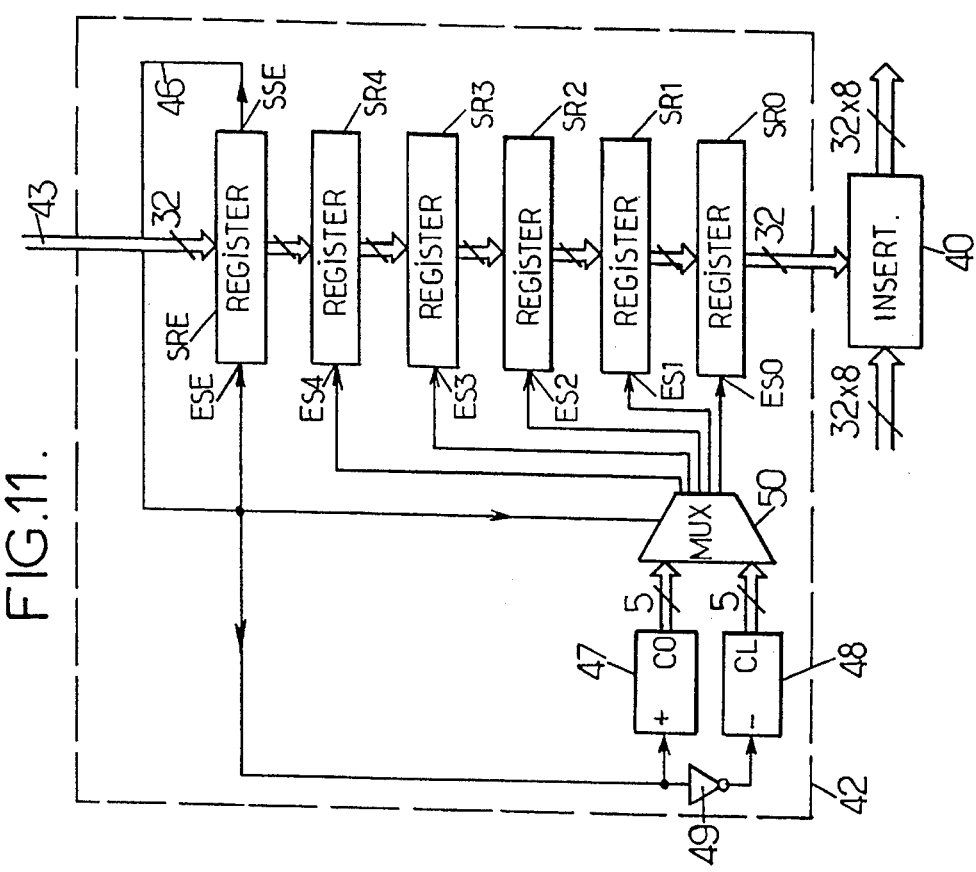
FIG. 11 is a diagram of a routing bits generator usable in the device of FIG. 5 when N=L=5.

When L=N, the routing bits generator 42 can be in accordance with the diagram of FIG. 11, compiled for L=N=5, the switching fabrics R0 to R7 then being such as that of FIG. 2. This diagram is similar to that of FIG. 6, with an extra addressing register SR4 for the fifth address bits b(4), the counters 47,48 and the multiplexer 50 operating on 5 bits. When L=N, the feedback line 46 connects the serial output SSE of the state register directly to its serial input, the filtering means 58, 59 being purposeless since no overflow of capacity can arise in the reverse Omega networks R0 to R7. The operation of the device when L=N is identical to that described earlier. However, it is unnecessary to force excess cells to zero since there is no concentration stage and since the cells tagged as free (CA=0) are not recorded in the output queues. In other words, in the multiplexers 60 of the insertion means (FIG. 9), it is possible to dispense with the AND gates 65 by addressing the logical complement of the signal SELM directly to the inputs of the AND gates 66.

If, when L=N, the arrays G0 to G7 of output queues are dispensed with, the device operates as a $2^N$ channels traffic equalizer. In this case, it is not indispensable to insert the state bits CA at the head of the cells, that is to say the state register SRE need not be cascaded with the addressing registers SR4, ... ,SR0 (FIG. 11), the serial input ESE of the state register need not be connected to its serial output SSE, and the multiplexers 60 can be controlled by the signal SELD in such a way as to insert only the L address bits at the head of each cell (FIGS. 9 and 10).

I claim:

1. Asynchronous transfer mode data cell routing device comprising at least one reverse Omega network with L stages and $2^N$ ordered inputs respectively receiving $2^N$ synchronized data cells, L and N being two integers such that $L \leq N$, and a routing bits generator, wherein the routing bits generator comprises:

a parallel input for receiving $2^N$ state bits respectively assigned to said $2^N$ synchronized cells for indicating marked and unmarked cells among said $2^N$ synchronized cells;

a state register of $2^N$ bits, having a serial shift mode and a parallel transfer mode in which it receives said $2^N$ state bits received on the parallel input;

a first counter on L bits, incremented by one unit when a state bit obtained from a serial output of the state register in serial shift mode indicates a marked cell, said first counter having a first initialization value;

a second counter on L bits, decremented by one unit when the state bit obtained from the serial output of the state register in serial shift mode indicates an unmarked cell, said second-counter having a second initialization value which is less than said first initialization value;

L addressing registers of $2^N$ bits each, having a serial shift mode and a parallel transfer mode, cascaded so that the (i+1)-th addressing register receives the contents of the i-th addressing register in parallel transfer mode for $1 \leq i \leq L$; and a multiplexer having L output bits addressed respectively to serial inputs of the L addressing registers, a first L-bit input connected to the output of the first counter on L bits and selected when the state bit obtained from the serial output of the state register in serial shift mode indicates a marked cell, and a second L-bit input connected to the output of the second counter on L bits and selected when the state bit obtained from the serial output of the state register in serial shift mode indicates an unmarked cell, the routing device further comprising routing bits insertion means successively receiving L sets of $2^N$ address bits from the L-th addressing register in parallel transfer mode, in order to insert, at the head of each one of said $2^N$ cells respectively addressed to the $2^N$ ordered inputs of the network, routing bits comprising L address bits corresponding to said cell, received in succession from a respective location of the L-th addressing register in parallel transfer mode.

2. Device according to claim 1, operating as $2^N$ by 1 multiplexer, wherein L=N, wherein a feedback line connects the serial output of the state register directly to a serial input of the state register, wherein the state register is cascaded with the N addressing registers in such a way that the first addressing register receives the contents of the state register in parallel transfer mode, wherein the routing bits insertion means receive the $2^N$ state bits from the N-th addressing register after the N sets of $2^N$ address bits, and are arranged in order to insert, at the head of each cell and after the N address bits corresponding thereto, the state bit assigned to said cell, and wherein each of the $2^N$ outputs of the reverse Omega network is connected to a respective output queue into which writing of the data of a cell is performed only if the state bit inserted at the head of said cell indicates a marked cell, the $2^N$ queues being read out cyclically to the output of the device.

3. Device according to claim 1, wherein L<N, wherein the L stages of the reverse Omega network are followed by N–L successive concentration stages, the k-th concentration stage comprising $2^{N-k}$ OR gates with two inputs connected respectively to two consecutive outputs of the preceding stage, for $1 \leq k \leq N-L$, wherein a feedback line connects the serial output of the state register to a serial input of the state register, said feedback line including filtering means for transmitting to the serial input of the state register the state bit provided by the serial output of the state register in serial shift mode as long as the number of state bits indicating marked cells which have been thereby transmitted since the reception in parallel of a set of $2^N$ state bits by the state register does not exceed $2^L$, and for transmitting to the serial input of the state register a state bit value representative of an unmarked cell when said number of state bits has exceeded $2^L$, wherein the state register is cascaded with the L addressing registers in such a way that the first addressing register receives the contents of the state register in parallel transfer mode, and wherein the routing bits insertion means receive from the L-th addressing register, after the L sets of the $2^N$ address bits, the $2^N$ state bits filtered by the filtering means, and are arranged so as to set to zero the information bits of any cell for which the filtered state bit indicates an unmarked cell.

4. Device according to claim 3, operating as $2^N$ by 1 multiplexer, wherein the routing bits insertion means are arranged in order to insert, at the head of each cell and after the L address bits corresponding thereto, the filtered statebit assigned to said cell, and wherein each of the $2^L$ outputs of the (N–L)-th concentration stage is connected to an output queue into which writing of the data of a cell is performed only if the filtered state bit inserted at the head of said cell indicates a marked cell, the $2^L$ queues being read out cyclically to the output of the device.

* * * * *